United States Patent [19]

Knuth

[11] 4,081,871

[45] Apr. 4, 1978

[54] ELECTRICIAN'S WIRE STRIPPING TOOL

[76] Inventor: Everett F. Knuth, 814 - 16th Ave. NE., Rochester, Minn. 55901

[21] Appl. No.: 775,614

[22] Filed: Apr. 4, 1978

[51] Int. Cl.² .................. R26B 11/00; H02G 1/12
[52] U.S. Cl. ............................... 7/107; 30/91.1; 81/9.5 B
[58] Field of Search ............ 7/1 B, 14.1 R, 5.1, 7/5.2, 5.4, 5.5; 81/9.5 R, 9.5 B, 9.5 C, 181; 30/279, 91.1, 91.2, 90.9, 90.8, 90.6, 162, 320, 335, 336

[56] References Cited

U.S. PATENT DOCUMENTS

| | | | |
|---|---|---|---|
| 1,619,181 | 3/1927 | Beretz | 30/91.2 |
| 1,672,642 | 6/1928 | Hemphill | 7/5.1 |
| 2,817,255 | 12/1957 | Lormeau | 81/9.5 R X |
| 3,058,377 | 10/1962 | Hardt | 30/91.2 |
| 3,314,148 | 4/1967 | Foellmi | 30/162 |
| 3,316,635 | 5/1967 | Merrow | 30/335 X |
| 3,431,645 | 3/1969 | Powell | 30/90.6 |
| 3,813,966 | 6/1974 | Knuth | 30/279 R |

Primary Examiner—James L. Jones, Jr.
Assistant Examiner—Nicholas P. Godici
Attorney, Agent, or Firm—Burd, Braddock & Bartz

[57] ABSTRACT

An electrician's tool for stripping outer insulating sheathing from multiple conductor electrical cable and for stripping insulation from individually insulated conductors. The tool is characterized by a first flat blade for removing sheathing from one side of a multiple conductor cable to expose the individual conductors, without damaging the individual insulation of those conductors, and a longitudinally retractable knife blade for cutting off the sheathing folded back and separated from the opposite side of the conductors. The tool also preferably has separate blade means for stripping insulation from the ends of individually insulated conductors. The tool is of simple compact construction comprising a pair of arms pivotally connected at one end and carrying the several blade means.

7 Claims, 5 Drawing Figures

4,081,871

ELECTRICIAN'S WIRE STRIPPING TOOL

BACKGROUND OF THE INVENTION:

1. Field of the Invention

This invention is directed to an electrician's tool for stripping outer insulating sheathing from multiple conductor electrical cable and for stripping insulation from individually insulated conductors. Electrical cable comprised of two or more conductors enclosed within an outer protective insulating sheathing of thermoplastic or other similar resinous insulating material is widely used in electrical construction, maintenance and repair. Such cable is of generally flat configuration including most generally a pair of separate individually insulated conductors laid in parallel spaced apart relation and commonly a bare uninsulated grounding conductor embedded in the sheathing midway between the pair of insulated wires. The tool is equally adapted to stripping the sheathing from type NM multiple conductor cables having a round configuration with three conductors and one ground wire, as well as flat UF and NM cable assemblies. In making electrical connections in outlet boxes, switch boxes, electrical panels, etc., in making junction splices, and the like, it is necessary that anywhere from 6 to 8 inches to 2 feet or more of the insulating sheathing must be removed to expose the indivdual conductors. It is also necessary that an inch or two of the insulation of the individually insulated conductors be removed to make the electrical connections.

2. The Prior Art

In my prior U.S. Pat. No. 3,813,966, issued June 4, 1974, there is disclosed an electrician's wire stripping tool for accomplishing some of these needs. The tool of that patent, although the best heretofore available for its intended purpose, is limited in its utility to the removal of one or more surface layers of sheathing. Then the electrician must lay aside the tool while he picks up a jack knife of similar cutting tool to sever that portion of the sheathing pulled away and separated from the individual conductors but still attached to the body of the sheathing. Also, a separate tool was required for stripping the insulation from the ends of individually insulated conductors. The tool of the present invention is an improvement over that of my prior patent. It is more versatile in that it alone performs the functions required for preparing a cable for making electrical connections.

SUMMARY OF THE INVENTION

The electrician's tool according to the present invention for stripping insulating sheathing from multiple conductor electrical cable comprises handle means including a pair of arms pivotally connected at one end for opening and closing pincer or scissor movement. Near the free end of one of the arms a longitudinally extending flat stripping blade means is disposed over a transverse groove in the inside edge of the arm. The cutting edge of the blade is spaced from the bottom of the groove and the blade is disposed at an acute angle relative to the plane including the longitudinal axes of the arms. The portion of the other arm adjacent the free end opposite from the blade means functions as a smooth cable hold-down means when the arms are in closed position.

The other arm has an internal longitudinal channel near the free end in which a longitudinally reciprocable blade holder is disposed. The blade holder extends partially through the end of the channel in the free end of the other handle arm so that when a flat knife blade is secured in the holder, a substantial portion of that blade extends beyond the free end of the handle arm when the holder is in extended position. A thumb actuating means carried on the blade holder and extending through a longitudinal slot in the handle arm permits ready extension and retraction of the holder and blade. The retractable knife blade is used for removing sheathing folded back and separated from the conductors but still integral with the sheath body.

The tool preferably also includes means for removing insulation from the individually insulated conductors. A pair of opposed complementary flat members are each secured to an outer face of one of the handle arms adjacent the inside edges near the pivotal connection of the handle. Each of these blade members has an inner straight edge which abuts the other when the arms are in closed position. Each of the blade members has at least one semi-circular cutting edge. When the edges of the blade members are in abutment, the semi-circular cutting edges form a circular aperture. Preferably several of such apertures are provided, each for a different gauge of wire. A transverse channel in the inside edge of each of the handle arms is provided in longitudinal alignment with each of the semi-circular cutting edges.

BRIEF DESCRIPTION OF THE DRAWINGS

The invention is illustrated in the accompanying drawings in which corresponding parts of identified by the same numerals and in which.

Figure 1:
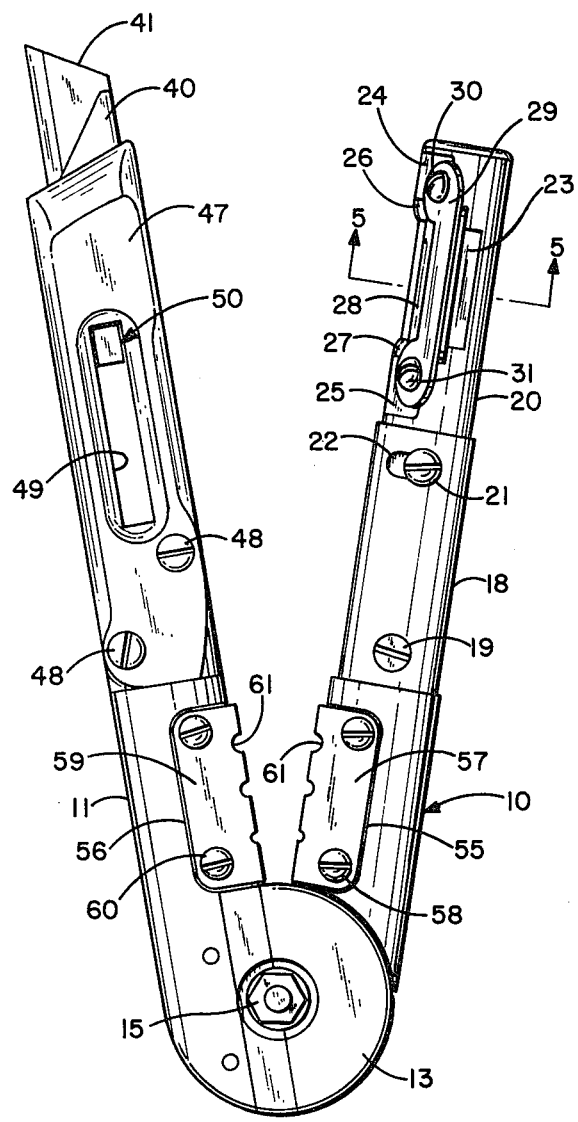
FIG. 1 is a front elevation of the electrician's wire stripping tool shown with the handle arms in open position.

DETAILED DESCRIPTION OF THE PREFERRED EMBODIMENT:

Referring now to the drawings, the tool according to the present invention includes a handle means comprised of a first arm 10 and a second arm 11 of approximately equal length pivotally secured together in a circular hinge. The hinge is comprised of a pair of generally circular plates 12 and 13 whose thickness is about half of that of the handle arms offset to fit together in face-to-face relation and secured as by bolt 14 and nut 15 or equivalent fastening means.

Handle 10 includes a solid cylindrical closed end portion 16 integral with hinge plate 12 and recessed around its periphery at its free end to provide a mounting stud 17. One end of a tubular sleeve 18 fits with a slide fit over stud 17 and is held fixed by screw 19. A generally cylindrical solid stripping blade support member 20 is fit with a slide fit in the opposite end of sleeve 18. Screw 21 extending through slot 22 in sleeve 18 secures support member 20 to the handle while permitting limited rotational adjustment about the longitudinal axis of arm 10 to adjust the blade angle.

A transverse groove 23 is formed in the inside edge of blade support member 20. Groove 23 is of a width sufficient to receive a multiple conductor electrical cable of the types and sizes in common use. A pair of flat coplanar recesses 24 and 25 are formed in the stripper blade support member 20 on opposite sides of groove 23. A further pair of deeper flat coplanar recesses 26 and 27 are formed immediately adjacent to the opposite sides of groove 23. Recesses 26 and 27 are of depth slightly less than the thickness of stripper blade 28 whose opposite ends rest therein and which spans the groove. Blade 28 is held in fixed position by blade retainer 29 whose ends rest in recesses 24 and 25 and are tightly secured by screws 30 and 31.

Figure 5:
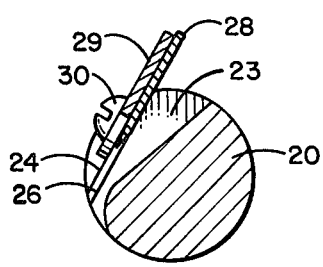
FIG. 5 is a transverse section on the line 5—5 of FIG. 1 and in the direction of the arrows.

As best seen in FIG. 5, the cutting edge of blade 28 defines a relatively narrow throat with the bottom of groove 23 which determines the depth of cut into the insulating sheath of the cable. This can be adjusted by loosening screws 30 and 31 sufficient to permit relative movement between the blade and blade retainer and then retightening. Ideally the depth of cut should be sufficient to expose the individually insulated conductors, and the ground wire if present, without cutting into the insulation of the individual conductors or the ground wire.

The angle of blade 28 relative to the cable being stripped can be varied by rotation of the blade support member 20 within sleeve 18. Blade 28 should be at an angle between about 45° and 60° relative to the plane including the longitudinal axes of handle arms 10 and 11. Thus, when the tool is in use, the blade is at an angle between about 30° and 45° relative to the cable which is generally perpendicular to the plane formed by the axes of the handle when the tool is used for stripping. The inside edge of handle arm 11 serves as a cable holddown means to hold the cable in engagement with the stripping blade when the tool is in use.

Figure 2:
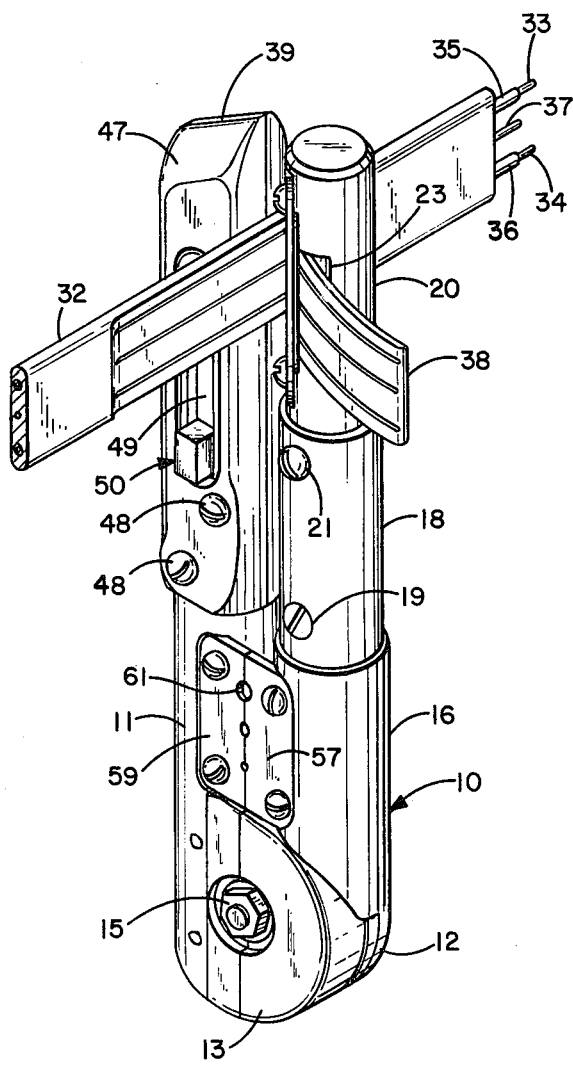
FIG. 2 is a perspective view of the same tool shown with the arms closed and in use stripping sheathing from an electrical cable.
Figure 3:
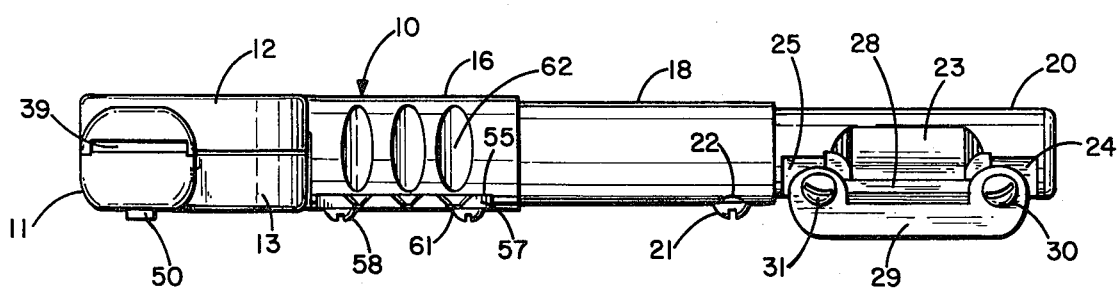
FIG. 3 is a plan view of the tool with the arms at right angles showing the end of the left hand handle arm and the inside surface of the right hand handle arm, as shown in FIG. 1.

As seen in FIG. 2, the end of a length of cable 32 including a pair of conductors 33 and 34, each having a separate insulating layer 35 and 36, respectively, and a ground wire 37, is grasped in one hand and the stripping tool is grasped in the other hand between the stripping blade and hinge end. The cable is positioned between the arms of the handle generally underlying the stripping blade spaced inwardly from the cable end, depending upon the amount of stripping desired. The tool arms are then squeezed with firm hard pressure to bring the stripping blade into cutting engagement with the cable sheath and the tool and cable are moved relative to one another with one simple stroke by pulling the cake through the tool, or holding the cable fixed and moving the tool toward the end of the cable, or a combination of these two movements.

The stripped off portion 38 of the sheath is totally separated from the cable. With the conductors exposed, as shown, it is then a relatively easy matter to fold back that portion of the sheathing on the opposite side of the conductors from the portion which has been removed to separate the conductors from the sheathing. That folded back portion of sheathing is then severed and removed utilizing the retractable blade in the other handle arm.

Figure 4:
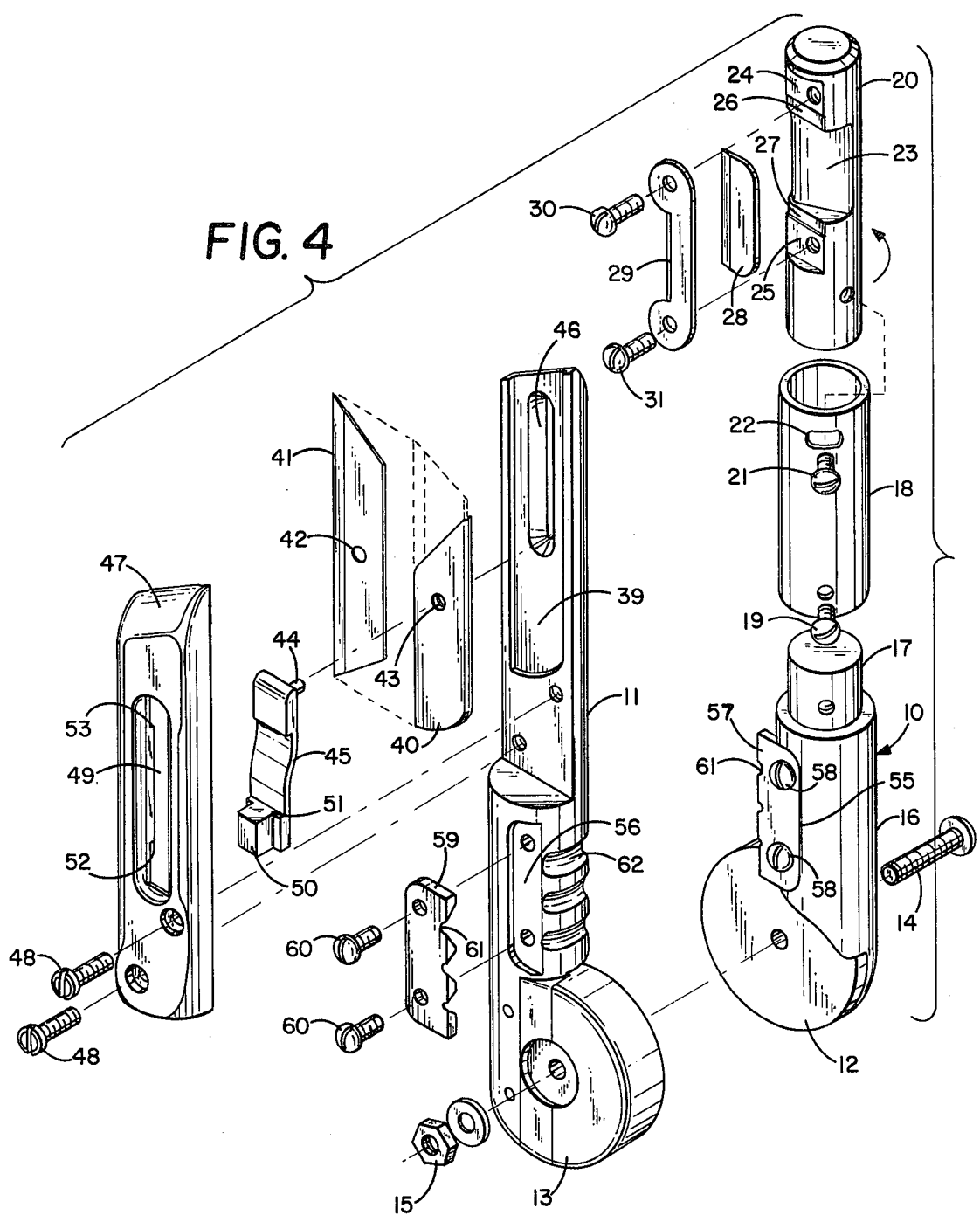
FIG. 4 is an exploded perspective view of the component parts of the tool.

As best seen in FIG. 4, arm 11 has an elongated longitudinally extending channel 39 extending from the free end of that arm toward the opposite end. A knife blade holder 40 formed from metallic sheet material bent and folded upon itself with a space between the opposed inner surfaces to receive a cutting blade 41 is adapted for longitudinal reciprocal movement in channel 39. Blade 41 is fit into the blade holder 40 with hole 42 in registry with holes 43 in the blade holder. A pin 44 carried by one end of a reciprocable linkage and retractor assembly 45 extends through holes 42 and 43 to retain the blade in the blade holder and to facilitate reciprocation of the knife assembly. A slot 46 in the bottom of channel 39 receives the free end of pin 44. A cover plate 47 overlies channel 39 and is firmly secured to arm 11 by means of screws 48.

Cover plate 47 has a longitudinal slot 49 through which a thumb actuator knob or button 50 carried by linkage and retractor assembly 45 extends. Linkage and retractor assembly 45 is guided longitudinally in a channel in the inside face of cover plate 47 underlying slot 49. The body of linkage and retractor assembly 45 is formed from a material having resilient properties, such as nylon, which is also self-lubricating, and the body has a slight central bow such that in the assembled tool, the ends of the linkage body are under slight compression because of force exerted by the cover plate 47. The linkage and retractor body has a transverse shoulder 51 adjacent the base of thumb actuator 50 which engages recessed shoulders 52 on the inside of cover plate 47 on opposite sides of slot 49. To extend the knife blade assembly, thumb actuator 50 is first depressed to release the engagement of shoulders 51 and 52 and the linkage assembly is pushed toward the free end of arm 11 until the heel surface of the linkage body engages recessed shoulders 53 at the opposite end of slot 49 to hold the assembly locked in extended position.

After the strip portion 38 of the cable sheath has been removed, the remaining portion of the end of the sheath can be readily peeled back and separated from the conductors while still retaining the tool in the hand. Then, by simple movement of the thumb exerting pressure and outward direction on the actuator button 50, the knife blade is extended and locked in position. Holding the folded back portion of the sheathing in a loop with the other hand, it is easily severed.

After the sheathing is removed, it is still necessary to remove the insulation for a short distance from the ends of the individually insulated conductors. In order to accomplish this, the faces of arms 10 and 11 adjacent the hinge joint are provided with flat recesses 55 and 56, respectively. A flat wire stripping blade member 57 is secured in recess 55 by means of screws 58. A similar complementary mirror image blade member 59 is secured in recess 56 by screws 60. When the tool is closed, the inner edges of blade members 57 and 59 are in edge-to-edge abutment, as seen in FIG. 2.

Each wire stripping blade member has one or more semi-circular cutting edges 61 on the inner edge of the blade member. These semi-circular cutting edges are so positioned that when the tool is closed with the edges of the blade members 57 and 59 in edge-to-edge abutment, a circular aperture is formed flaring from the circular cutting edge. Preferably a plurality of such semi-circular cutting edges are provided, each of a different size corresponding to the gauges of wire most often encountered in building construction, 10, 12 and 14 gauge, for example. A plurality of transverse grooves 62 are provided in the inner edges of the handle arms corresponding in number to the number of cutting apertures in blade members 57 and 59 and in alignment with those apertures.

To strip the insulation from the individually insulated conductors, the direction of the tool in the hand is reversed and the tool is grasped by the free ends of arms 10 and 11. The end of the wire to be stripped is laid in one of grooves 62 corresponding to the gauge of that particular wire and the handles are closed clamping the semi-circular cutting edges against and into the insulation and cutting it down to the wire surface. Then, with a simple pulling motion, the end of the wire is removed from that severed portion of insulation.

The tool of the present invention is versatile in that it performs three necessary functions required to be performed dozens of times per day by electricians doing wiring jobs in the course of construction, maintenance and repair. Its use results in significantly more efficient utilization of the electrician's time with resulting monetary savings. It is of simple durable construction designed for a long useful life. The cutting blades are readily replaced. Both the depth of cut and cutting angle of stripping blade 28 are easily adjusted. Although the tool as illustrated is for right hand use, the tool can readily be made in a left-handed model.

It is apparent that many modifications and variations of this invention as hereinbefore set forth may be made without departing from the spirit and scope thereof. The specific embodiments described are given by way of example only and the invention is limited only by the terms of the appended claims.

The embodiments of the invention in which an exclusive property or privilege is claimed are defined as follows:

1. A tool for stripping insulation from multiple conductor electrical cable comprising:
    A. handle means adapted to be grasped in the palm of a hand and including a pair of arms pivotally connected at one end for opening and closing pincer movement,
    B. a transverse groove in the inside edge of one of said arms adjacent the free end thereof,
    C. longitudinally extending flat cable stripping blade means disposed overlying said groove,
        1. the cutting edge of said blade being spaced from the bottom of said groove, and
        2. said blade being disposed at an angle from about 45° to 60° from the plane including the longitudinal axes of the arms,
    D. smooth cable hold-down means on the inside edge of the other of said arms adjacent the free end thereof, overlying said groove and spaced from said blade means when said arms are in closed position,
    E. an internal longitudinal channel in said other arm adjacent the free end thereof, one end of said channel opening into said free end,
    F. a longitudinally reciprocable knife blade holder disposed in said channel for reciprocation therein partially through said open end,
    G. a flat knife blade in said blade holder,
    H. a longitudinal slot in said other arm overlying said channel over part of its length, and
    I. thumb actuating means associated with said blade holder and extending through said longitudinal slot for extending and retracting said holder and knife blade, said thumb actuating means being within normal reach of the thumb of the hand grasping the handle means, whereby the insulation may be stripped from one side of a cable and folded back and cut from the other side without disengaging the tool from the hand.

2. A tool according to claim 1 further characterized in that further wire insulation stripping blade means are provided adjacent the pivotal connection of the handle means, said further blade means comprising:
    A. a pair of opposed complementary flat mirror image wire stripping blade members each secured to an outer face of one of said arms adjacent the inside edges thereof,
    B. an inner straight edge on each of said blade members, said edges abutting when the arms are in closed position,
    C. at least one semi-circular cutting edge in each of said blade members, said cutting edges forming a circular aperture when the arms are in closed position, and
    D. a transverse channel in the inside edge of each of said arms in longitudinal alignment with said semi-circular cutting edges.

3. A tool according to claim 1 further characterized in that:
    A. said first named handle arm includes a tubular portion,
    B. said transverse groove is disposed in a generally cylindrical solid stripping blade support member fit with a slide fit in said tubular portion for rotational movement therein, and
    C. fastening means are provided for securing said blade support member at any of several different rotational positions.

4. A tool according to claim 1 further characterized in that:
    A. said first named handle arm includes a cable stripping blade support member,
    B. said transverse groove is formed in said support member,
    C. said support member includes a pair of flat coplanar recesses on opposite sides of said groove,
    D. said recesses include a further pair of flat deeper coplanar recesses immediately adjacent to the opposite edges of said groove,
    E. the ends of said flat cable stripper blade are supported in said deeper recesses spanning said groove,
    F. a blade retainer overlies said blade and is supported in said first named recesses, and
    G. fastening means are provided for securing said blade retainer to said blade support member.

5. A tool according to claim 1 further characterized in that:
    A. said thumb actuating means is disposed on one side of a separate linkage retractor member disposed for reciprocable movement in said longitudinal channel,
    B. said knife blade and blade holder each include a hole therethrough, and
    C. a linkage pin is carried by the opposite side of said retractor member extending through the holes in said blade and blade holder to reciprocate them together responsive to the thumb actuator.

6. A tool according to claim 5 further characterized in that:
    A. said linkage and retractor member is formed from resilient material,
    B. said member is formed with a central bow whereby said thumb actuator and linkage pin are under compressive force in the assembled tool,
    C. said thumb actuator includes a pair of longitudinally spaced apart transverse shoulders and said longitudinal slot through which the thumb actuating means extends includes a pair of spaced apart transverse recesses engageable in sequence with said shoulders upon reciprocation of the actuating means, whereby said knife blade may be locked in retracted and extended positions.

7. A tool according to claim 2 further characterized in that each of said further wire stripping blade members includes a plurality of semi-circular cutting edges of differing diameters corresponding to commonly used wire gauges.

* * * * *

UNITED STATES PATENT AND TRADEMARK OFFICE
CERTIFICATE OF CORRECTION

PATENT NO. : 4,081,871
DATED : April 4, 1978
INVENTOR(S) : Everett F. Knuth

It is certified that error appears in the above-identified patent and that said Letters Patent are hereby corrected as shown below:

In the heading, after "Filed:", "Apr. 4, 1978" should be --March 8, 1977--.

Column 1, line 39, "of" (first occurrence) should be --or--.

Column 2, line 13, after "flat", --blade-- is omitted.

Column 3, line 50, "cake" should be --cable--.

Column 3, line 63, after "an", --internal-- is omitted.

Column 6, line 51, after "linkage", --and-- is omitted.

Signed and Sealed this

Eighteenth Day of July 1978

[SEAL]

Attest:

RUTH C. MASON
Attesting Officer

DONALD W. BANNER
Commissioner of Patents and Trademarks